(12) United States Patent
Fish

(10) Patent No.: US 11,840,175 B2
(45) Date of Patent: *Dec. 12, 2023

(54) TRAFFIC SIGNAL ALARM DEVICE HAVING NO NAVIGATIONAL CONTROL

(71) Applicant: Robert D. Fish, Irvine, CA (US)

(72) Inventor: Robert D. Fish, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/108,216

(22) Filed: Feb. 10, 2023

(65) Prior Publication Data

US 2023/0191993 A1    Jun. 22, 2023

Related U.S. Application Data

(63) Continuation-in-part of application No. 17/029,403, filed on Sep. 23, 2020, now Pat. No. 11,597,404.

(51) Int. Cl.
| | | |
|---|---|---|
| *B60Q 9/00* | (2006.01) | |
| *G06V 20/58* | (2022.01) | |
| *H04M 1/72454* | (2021.01) | |
| *G06T 7/55* | (2017.01) | |
| *G08G 1/0962* | (2006.01) | |

(52) U.S. Cl.
CPC ............. *B60Q 9/00* (2013.01); *G06T 7/55* (2017.01); *G06V 20/582* (2022.01); *G06V 20/584* (2022.01); *G08G 1/09623* (2013.01); *H04M 1/72454* (2021.01); *G06T 2207/30261* (2013.01); *H04M 2201/40* (2013.01)

(58) Field of Classification Search
CPC ... B60W 50/14; B60W 2050/143; G06T 7/55; G06T 2207/30252; B60R 11/04; B60R 2011/0003; G06K 9/00818; G06K 9/00825; G06K 9/4652
See application file for complete search history.

(56) References Cited

U.S. PATENT DOCUMENTS

| | | | | |
|---|---|---|---|---|
| 8,669,857 | B2* | 3/2014 | Sun ................. | B60Q 9/008 340/425.5 |
| 9,248,832 | B2* | 2/2016 | Huberman ......... | G06V 20/584 |
| 9,535,423 | B1* | 1/2017 | Debreczeni ........ | G05D 1/0246 |
| 9,558,411 | B1* | 1/2017 | Ferguson ........... | G05D 1/0246 |
| 9,616,877 | B2* | 4/2017 | Tanida .............. | B60W 10/11 |
| 10,083,607 | B2 | 9/2018 | Ginsberg et al. | |
| 10,141,716 | B1* | 11/2018 | Lenius .............. | G01S 17/06 |
| 10,528,047 | B1* | 1/2020 | Trujillo ............. | G06V 10/764 |
| 10,678,244 | B2* | 6/2020 | Iandola ............. | G06F 18/241 |
| 11,636,760 | B2* | 4/2023 | Fowe ................ | G06V 10/763 340/936 |

(Continued)

*Primary Examiner* — Santiago Garcia
(74) *Attorney, Agent, or Firm* — Fish IP Law, LLP

(57) ABSTRACT

The inventive subject matter provides devices and methods for improving driving safety using information obtained from images taken by a camera in a device. Among other things, contemplated devices and methods can produce alarms when it appear from rates of speed and acceleration/deceleration, that a vehicle will likely go through a red light, or fail to stop or sufficiently slow down at a stop sign. A significant feature of preferred devices and methods is that they are not dependent on WI-FI, cellular, satellite and radio signals, or any other external data transmission, and are not even dependent on speed, acceleration, or other information native to the vehicle.

20 Claims, 5 Drawing Sheets

(56) References Cited

U.S. PATENT DOCUMENTS

| | | | |
|---|---|---|---|
| 2006/0049927 A1* | 3/2006 | Arai | B60K 37/02 |
| | | | 340/438 |
| 2015/0151725 A1* | 6/2015 | Clarke | G06T 7/285 |
| | | | 701/28 |
| 2016/0318490 A1* | 11/2016 | Ben Shalom | B60W 30/18154 |
| 2017/0256034 A1* | 9/2017 | Bai | G06F 3/147 |
| 2017/0371608 A1* | 12/2017 | Wasserman | G07C 5/008 |
| 2018/0025636 A1* | 1/2018 | Boykin | G08G 1/096725 |
| | | | 701/1 |
| 2018/0244195 A1* | 8/2018 | Haight | G06V 20/588 |
| 2019/0031146 A1* | 1/2019 | Etonye | B60R 25/257 |
| 2019/0101919 A1* | 4/2019 | Kobilarov | G05D 1/0212 |
| 2019/0205674 A1* | 7/2019 | Silver | G05D 1/0223 |
| 2019/0206254 A1* | 7/2019 | Tao | B60W 30/0956 |
| 2019/0270431 A1* | 9/2019 | Clift | B60S 1/44 |
| 2020/0250473 A1* | 8/2020 | Elluswamy | G16Y 20/10 |
| 2020/0257317 A1* | 8/2020 | Musk | G05D 1/0033 |
| 2020/0265247 A1* | 8/2020 | Musk | G06N 20/00 |
| 2020/0307437 A1* | 10/2020 | Thieberger | B62D 47/006 |
| 2020/0320807 A1* | 10/2020 | Gorti | G07C 5/0816 |
| 2020/0320875 A1* | 10/2020 | Lacaze | G08G 1/22 |
| 2020/0380789 A1* | 12/2020 | Hutten | G06T 19/006 |
| 2020/0401136 A1* | 12/2020 | Iandola | G06V 10/764 |
| 2021/0046949 A1* | 2/2021 | Ito | B60W 60/0055 |
| 2022/0048432 A1* | 2/2022 | Switalski | G08G 1/012 |

\* cited by examiner

TRAFFIC SIGNAL ALARM DEVICE HAVING NO NAVIGATIONAL CONTROL

PRIORITY

This application is a CIP of, and claims priority to allowed U.S. patent application Ser. No. 17/029,403, filed Sep. 23, 2020, titled Traffic Signal Alarm Device. The '403 application, and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is driving safety and traffic signals.

BACKGROUND

The following description includes information that may be useful in understanding the present invention. It is not an admission that any of the information provided herein is prior art or relevant to the presently claimed invention, or that any publication specifically or implicitly referenced is prior art.

Approximately 1.35 million people die each year as a result of road traffic crashes. Traffic intersections can be especially dangerous. Statistics show that approximately 33 percent of all traffic accidents occurs at an intersection, and a staggering number of these accidents occur when a driver passes through the intersection under a red or yellow traffic light. A common problem is that drivers are distracted by the use of a smartphone or radio, and are not paying attention to nearby stop signals.

Some of these problems are being addressed by autonomous or semi-autonomous vehicles, which substitute human sensing and controls with electronic sensing and controls. As used herein, the terms "autonomous vehicles" and "semi-autonomous vehicles" are vehicles that use (1) native sensors and (2) native controls to assist in sensing and controlling velocity and acceleration of a vehicle.

As used herein, "native sensors" are sensors that are factory-installed or dealer-installed in a vehicle. Examples of native sensors are installed light cameras, LIDAR, and RADAR devices used to identify objects in the environment, and in some instances used to estimate speed of a vehicle. As used herein, native sensors are not devices that a driver or passenger would typically bring into the vehicle for a drive, and then removed from the vehicle when the drive is over. It is known for drivers to connect a cell phone to vehicle to provide cellular or other connection, which could then be used by the vehicle to access maps, intersections, speed limits and so forth. However, as used herein, cameras and other sensors contained in ordinary consumer cell phones, such as one might purchase from Apple™, Samsung™, or Google™, are never considered to include native sensors because such phones are inherently portable (usable away from the vehicle), and not installed in the vehicle as part of its native configuration. This is the case even if such cell phones are temporarily locked by a user into a holder, rather than removed each time a user enters or leaves a vehicle.

Also as used herein, "native controls" are controls that are factory-installed or dealer-installed in a vehicle, not controls that a driver or passenger might bring into vehicle for a drive, and then removed from the vehicle when the drive is over. Examples of native controls are installed solenoids that operate steering, adaptive cruise controls that control fuel or electricity consumption, and emergency braking systems that automatically brake a vehicle to avoid hitting a nearby object. Even if a user were to somehow operate a native control with an ordinary consumer cell phone, such as one might purchase from Apple™, Samsung™, or Google™, the cell phone and electronics with the cell phone would not be considered native controls, because such phones are inherently portable, and not installed in the vehicle as part of its native configuration. This is the case even if such cell phones are temporarily locked by a user into a holder, rather than removed each time a user enters or leaves a vehicle.

A continuing problem exists, however, in that most vehicles on the road have neither the sensors nor the controls to adequately substitute for human sensing and control. And even though it is possible after-market installation of suitable sensors and controls in such legacy vehicles, doing so is not commercially feasible for the hundreds of millions of such vehicles.

What is needed are systems and methods in which an ordinary cell phone can be used to determine velocity of a motor vehicle, and warn the driver of environmental dangers, all without reliance on native sensors. In this way, legacy vehicles can gain some of the safety features that are inherent in advanced autonomous vehicles, at extremely low marginal cost. The prior art, however, fails to teach, suggest, or motivate such systems or methods.

Kobilarov (US 2019/0101919) specifically focuses on trajectories (i.e., route planning) of autonomous vehicles. The closest teaching is in para [0124], where an autonomous vehicle can alter its route or speed to avoid an accident. However, the sensors are native, and there is absolutely no teaching, suggestion, or motivation to provide any sort of warning signal to the driver to do anything. Moreover, there is no teaching, suggestion, or motivation that a camera used to provide information to trigger such a warning could be portable, let alone a cell phone.

Clark (US 2015/0151725) also focuses on autonomous vehicles, using cameras to provide navigation features to control autonomous actions of vehicles. Here again, the cameras are native. There is no indication that such cameras could be portable, let alone a cell phone.

Yang (2020/0384998) also focuses on autonomous vehicles, using data from native light cameras, LIDAR, and RADAR to determine vehicle speed. Once again the sensors are all native. There is no indication that such sensor could be portable, let alone a cell phone.

Trujillo (U.S. Ser. No. 10/528,047) also focuses on autonomous vehicles, using a native camera to generate a take-over request to warn the driver about some action that the vehicle might be autonomously performing. As with the other references cited above, there is no indication that the camera used could be portable, let alone a cell phone.

Thus, there is still a need to improve driving safety, using a device that alerts a driver to upcoming stop signals, but without deriving position or velocity information from a native sensor or other electronics native to the vehicle, and preferably without having any mechanism for automatically exerting navigational control over the vehicle.

SUMMARY OF THE INVENTION

The inventive subject matter provides systems and methods in which stop signal information is obtained from images taken by a camera positioned inside of a vehicle. The camera is not native to the vehicle, and is preferably an ordinary cell phone. It is also preferred that the systems and methods operate without reliance on data transmission from Wi-Fi, cellular, satellite, or any other pathways, and without utilizing speed or other data native to the vehicle.

The inventive subject matter includes a method of improving safety of a motor vehicle having a windshield, comprising steps of
1) Providing a device that includes (a) a camera configured to provide image data, and (b) a processor configured to analyze the image data;
2) Positioning the device in the motor vehicle such that the camera can take at least first, second, and third images through a windshield;
3) Associating the at least first, second, and third images with at least first, second, and third times, respectively;
4) Detecting a stop signal within each of the at least first, second, and third images using the processor;
5) Using the processor, the at least first, second, and third images, and the at least first, second, and third times to estimate a likelihood that the vehicle will stop before reaching entrance to an intersection, a crosswalk, or a target location; and
6) Issuing an alarm if the estimated likelihood is that the vehicle will enter the target location while the stop signal indicates that the vehicle should stop. In a preferred embodiment, the alarm is triggered only if the estimated likelihood is also greater than a selected risk tolerance. Where the stop signal is a stop sign, the alarm can be set to be triggered only if the vehicle is estimated to be moving into the target location above a specified speed, thus allowing for rolling stops.
7) Alarms can be terminated or delayed when the alarm condition no longer exists.

A significant feature of preferred devices and methods is that they are not dependent on WI-FI, cellular, satellite and radio signals, or any other external data transmission, and are not even dependent on speed, acceleration, as well as information native to the vehicle.

As used herein, the term "stop signal" includes a stop sign, a traffic light, the lighted color of a traffic light, and a brake light of a preceding car. In some embodiments, when the lighted color of the traffic light is green/blue, the device may wait an amount of time and take another image after the waiting period. Contemplated waiting times include anywhere between 0.1 and 5 seconds.

In preferred embodiments, the selected risk tolerance is also user adjustable.

Alarms can be triggered by any suitable means, and preferably by a combination of light and sound light. An advantage of using both light and sound is that alerts can escalate from unobtrusive steady light, to blinking lights, and on to include soft sounds and harsh sounds. In some contemplated embodiments, no alarm is triggered if current speed is lower than preset speed As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1A:
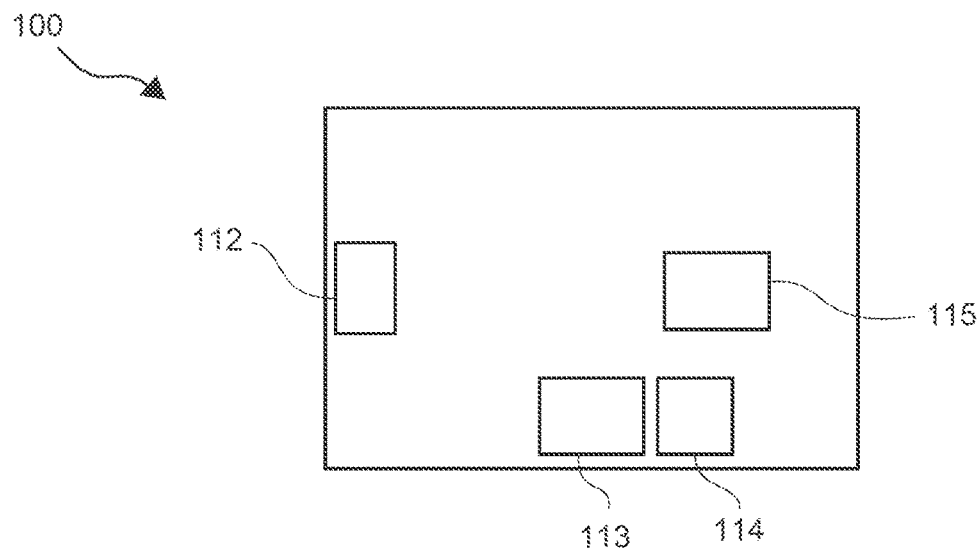
FIG. 1A is a schematic view of a device having a camera, a processor, a time measuring component and a designated area to terminate an alarm.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

All methods described herein can be performed in any suitable order unless otherwise indicated herein or otherwise clearly contradicted by context. The use of any and all examples, or exemplary language (e.g. "such as") described with respect to certain embodiments herein is intended merely to better illuminate the invention and does not pose a limitation on the scope of the invention otherwise claimed. No language in the specification should be construed as indicating any non-claimed element essential to the practice of the invention.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The inventive subject matter provides systems and methods in which stop signal information is obtained from images taken by a camera positioned inside of a vehicle. A significant feature of contemplated systems and methods is that they can be fully operational without dependence on any external data transmission, and without dependence on information native to the motor vehicle, for example, the vehicle's speed and acceleration obtained from wheel rotation.

As used herein, a target location (e.g., 246) refers to a location where a vehicle is supposed to stop to avoid illegal activity.

As used herein, a threshold distance (e.g., 245) is a distance between a stop signal (220) and a target location (246). The threshold distance can be user adjustable. In a preferred embodiment, the user can provide different threshold distances for different types of stop signals. For example, a user might set as a threshold distance, 5 m (meters) for a traffic light, 0 m for a stop sign, and 5 m for a brake light of a preceding vehicle. Where the stop signal is within an intersection (250), or at a far end of an intersection, the threshold distance can advantageously take into account the size of the intersection. Where the stop signal is a brake or other light in a leading vehicle, the target location will likely not be a fixed position in space, but rather a position relative to the leading vehicle, and the threshold distance stop signal might well depend on the speed of the vehicle carrying the device (e.g., 100).

As used herein, an alarming distance (e.g., 247) refers to a distance from a target location. Typically, a device contemplated herein would trigger an alarm only when the vehicle is within the alarming distance. The alarming distance can also be user adjustable. In a preferred embodiment, the alarming distance for each of the stop signals can be different, for example, 100 m for a traffic light, 20 m for a stop sign, and 10 m for a brake light of a preceding vehicle. Where the stop signal is a brake or other light in a leading vehicle, the alarming distance might also depend on the speed of the vehicle in which the contemplated device is positioned.

Triggering of an alarm should be interpreted herein in its broadest possibly manner, including that the device (100) issues alarms, or that the device (100) signals another device to issue an alarm. For example, device (100) might well be a cell phone that is coupled by wire or wirelessly to a vehicle speaker. In such instances, device (100) might send an audio alarm to be rendered by a vehicle speaker, and/or device (100) might send a visual alarm to be displayed on a heads-up dashboard display.

For simplicity of description and calculation in this application, distance from a vehicle carrying a device (100) to a stop signal is assumed to be the same as the distance from the device (100) to the stop signal—even though the device (100) would likely be located on a dashboard of the vehicle rather than at the very front of the vehicle.

FIG. 1A is a schematic of a device (100) according to inventive subject matter herein. Device (100) has a camera (112), a processor (113), a time measuring component (114) and a designated area to terminate an alarm (115). The time measuring component (114) is likely to be a clock within the processor.

Device (100) can be a cell phone, dedicated dashcam, a cell phone being used as a dashcam, or any other suitable device. The key features are (1) that device (100) is able to be positioned to receive images of stop signals (traffic signals, stop signs, tail lights of vehicles ahead of the vehicle, and (2) that the device either has electronics to process the images to provide warnings to the driver, or has communications capability (e.g., through a Bluetooth connection) to send the images to another device to process the images to provide such warnings. For example, device (100) might comprise little more than a camera, communications electronics to send received images to a cell phone elsewhere in the vehicle. Audible warnings could come directly from device (100), from a communicatively connected cell phone, or from a sound system in the vehicle.

Where device (100) comprises a cell phone being used as a dashcam, suitable dashcam software includes Car Camera™ and CamOnRoad for iOS, and CamOnRoad™, DailyRoads Voyager™, AutoGuard Dash Cam™, and CaroO™ for Android™.

Device (100) can be mounted in any suitable manner on or in the vehicle. For example, device (100) can be attached to a windshield or a dashboard using an appropriate mount. It is contemplated that such mounts could include a battery or other power supply that provides power to device (100) while in operation as contemplated herein. The cell phone mount could be powered by a power cord and/or photovoltaic cells. Such cells could be positioned on the face of the mount (between the mount and the cell phone), such that they can re-charge the mount when the cell phone is removed from the mount.

Figure 1B:
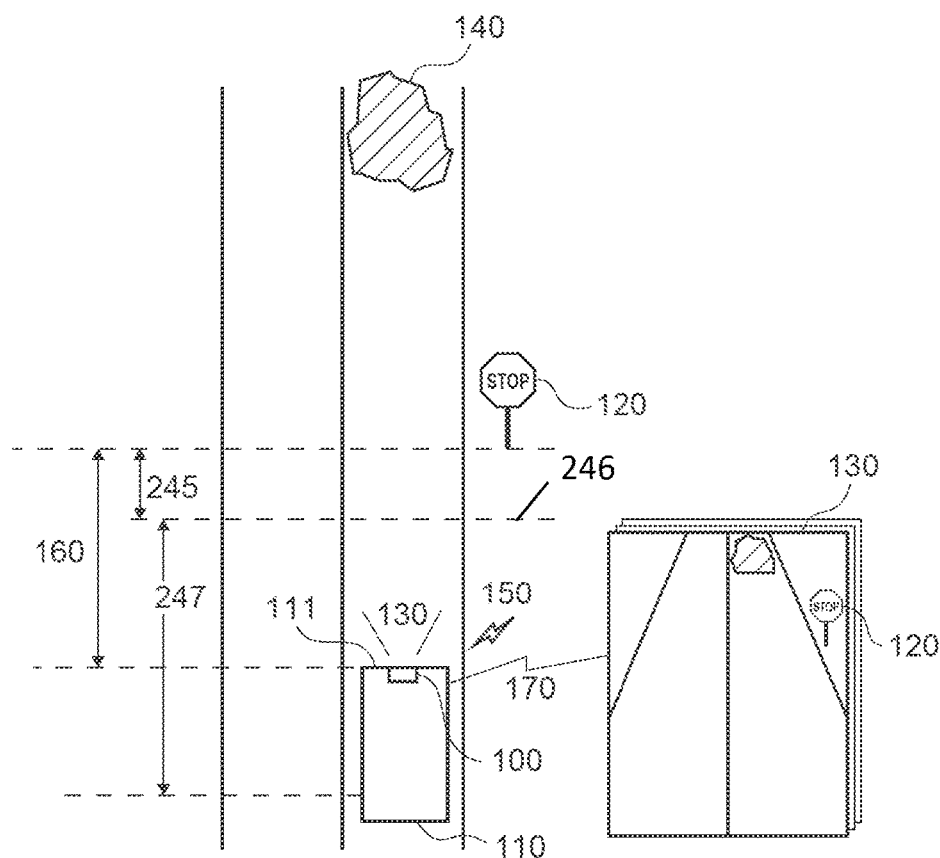
FIG. 1B shows a schematic view of a car and a stop sign on a street and a corresponding picture taken by a camera.

FIG. 1B shows a vehicle (110) coming closer to a stop sign (120). The device (100) is positioned on or near a windshield (111), such that the camera (112) can record forward images (130) from the vehicle (110). Device (100) is preferably, but not necessarily, a smartphone.

The processor (113) is configured to detect the stop sign (120) within the images (130). An analytical method to detect a stop sign within an image is described in US20200135016A1, which is incorporated herein by reference in its entirety. Other analytical methods and combination of known methods can be also used to detect stop signs.

Once stop sign (120) is detected, the processor (113) analyses whether the vehicle is located within the alarming distance (247). When the vehicle (110) is outside of the alarming distance (247), the device (100) will likely continue to take sets of images from time to time, trying to detect one or more stop signals (120, 220, 312). When the vehicle (110) is within the alarming distance (247), and the vehicle is accelerating (acceleration>0, determination of acceleration is described in FIG. 2), an alarm signal (180) is very likely triggered, depending on many factors. When the vehicle is decelerating (acceleration<0), the alarm signal (180) might or might not be triggered, again depending on many factors (details in description of FIG. 2).

All manner of alarm signals (180) are contemplated, including for example, sounds and/or lights, and specifically including beeping sounds and flushing/blinking lights. Alarm signal can be terminated as appropriate, for example, when the device detects appropriate deceleration of the vehicle. In some embodiments, an alarm signal can be terminated when a driver or other user touches a designated area (115) of the device (100), or issues an auditory command to the device (100) to stop the alarm signal.

Figure 2:
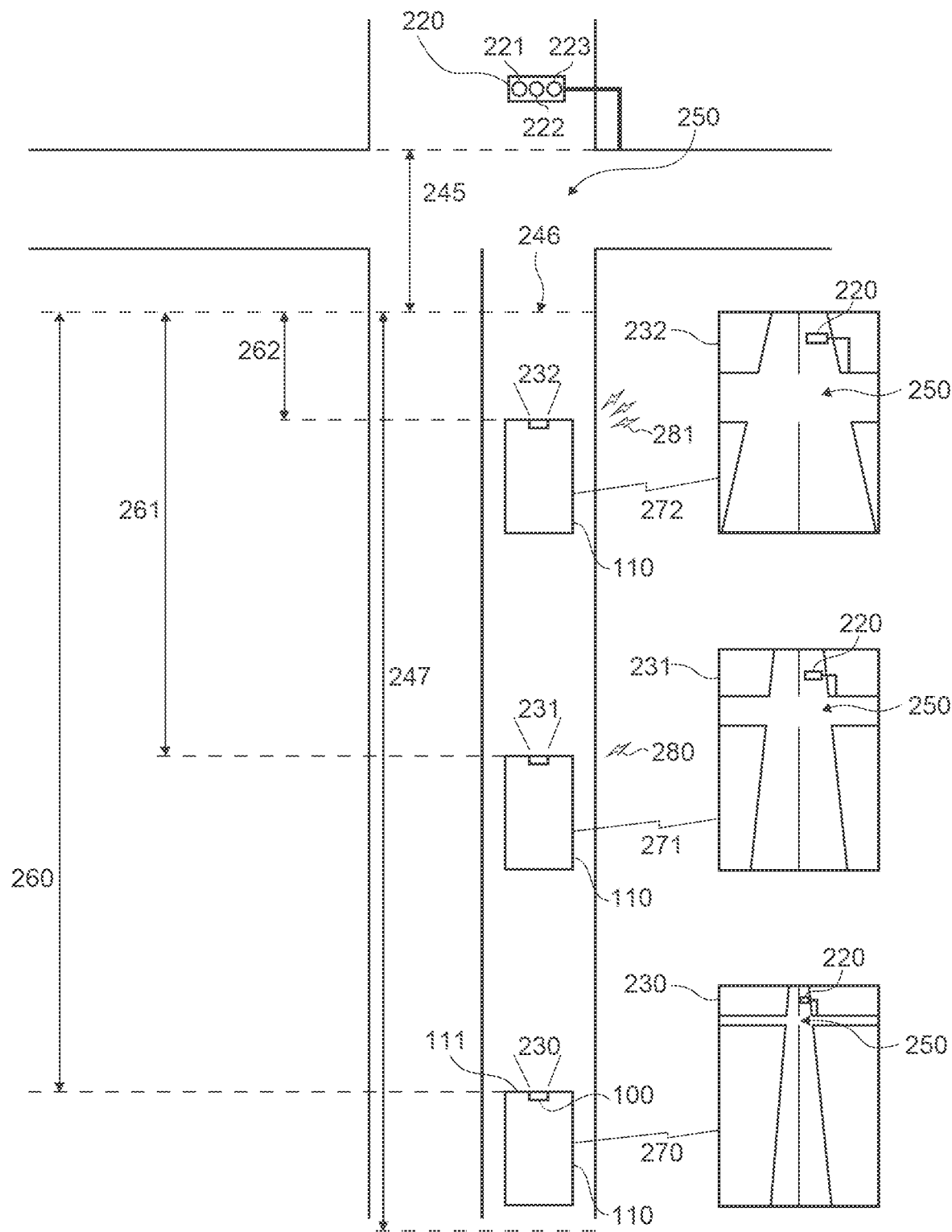
FIG. 2 shows a car and a traffic light on a street and a set of corresponding pictures at three different timings.

FIG. 2 shows a schematic view of vehicle (110) approaching a traffic light (220). In this case there are multiple stop signals, including a traffic light (220), a stop sign (120), and other signals such as a brake light of a preceding vehicle (312). The device (100) is preferably positioned on or near a windshield (211), such that the camera (112) can record front facing images (230, 231, 232) from within the vehicle (110).

Detection of Stop Signals and Distances

Processor (113) is configured to detect stop signals, including for example traffic light (220) within images (230, 231, 232). Once a stop signal is detected, the processor determines whether the vehicle (110) is within the alarming distance (247). If the vehicle is located outside the alarming distance (247), the device (100) will take additional images until the vehicle is located within the alarming distance (247). A contemplated analytical method to detect traffic lights, including vertical, horizontal, and arrow traffic lights, is described in U.S. Pat. No. 9,248,932, which is incorporated herein by reference in its entirety. Other methods or combination of the methods can be also used to detect traffic lights.

If the processor detects the traffic light (220) within the image (230, 231, 232), and the vehicle (110) is positioned within the alarming distance (247), the processor (113) analyzes the lighted color of the traffic light. A contemplated analytical method to analyze color in traffic lights is described in U.S. Pat. No. 9,248,932, which is incorporated herein by reference in its entirety. Other methods or the combination of the methods can be also used to analyze traffic light color. In preferred embodiments, detection of traffic lights and analysis of color is completely reliant on information contained in images (230, 231, 232) obtained from the camera (112). In preferred embodiments, extrinsic information, such as information from a traffic controller and/or a map, can optionally be used, but is not required.

In a preferred embodiment, when the lighted color (221, 222, 223) is detected as green or blue (223), the system can pause an amount of time, and then take another image and analyze the image again to detect the stop signal. The paused amount of time can be user adjustable, for example, 0.5 sec, 1.0 sec, 2.0 sec, or other delay up to 5 seconds.

When the lighted color (221, 222, 223) of the traffic light (220) shown in the image (230) is yellow (222) or red (221), the processor (113) is configured to calculate the vehicle distance (260, 261, 262) between the vehicle (110) and the traffic light (220) from the various images (230, 231, 232). The processor (113) also obtains from the time measuring component (114) the different time stamps (270, 271, 272) for each of the images (230, 231, 232).

Vehicle distance (260, 261, 262), and more generally distances between a vehicle and any stop signal can be determined using apparent changes in sizes of the stop signal between or among at least two images, according to methods describe in https://photo.stackexchange.com/questions/40981/what-is-the-relationship-between-size-of-object-with-distance, which is incorporated herein by reference in its entirety. Other methods include depth perception analysis, such as "3-D Depth Reconstruction from a Single Still Image" can be also used to calculate the distance. Combinations of methods can also be used to calculate the distance. Since both stop lights and stop signs can be assumed to have standard sizes, systems and methods contemplated herein can additionally or alternatively calculate distance by the sizes of such stop signals in the images taken by the device (100).

To save battery power, software can direct the processor to process images as described herein at various time intervals. For example, if no stop signal has been detected in the last few minutes, then the software might instruct the processor to delay by 3-5 seconds between processing subsequent sets of images. It is also contemplated that any such delays could be set in part according to the terrain. For example, suitable software might recognize that the vehicle is in a city or suburb where stop signals can, or have occurred, every few minutes. In those circumstances the delay might be reduced to only 1 second, a fraction of a second, or zero.

Velocity and Acceleration

Referring now to FIGS. 1 and 2, the processor (113) is configured to calculate the vehicle's speed and acceleration based upon deltas between successive distances (260, 261, 262), and their corresponding times (270, 271, 272), using general speed and acceleration equations. For example, a first speed of the vehicle, S1, can be calculated as the delta of the distances estimated by the first two images, divided by the delta of the time stamps for the first two images, (D1–D2)/(T2–T1). Similarly, a second speed of the vehicle, S2, can be calculated as the delta of the distances estimated by the second and third images, divided by the delta of the time stamps for the second and third images, (D2–D3)/(T3–T2). And acceleration/deceleration between the first and third images can be calculated as the change in speed from S1 to S2 divided by the time lapse from T1 to T3, (S1–52)/(T3–T1).

Accordingly, determination of a vehicle's speed and acceleration can be calculated entirely based upon images and timing obtained from the device (100). In such embodiments there is no need to rely on any data transmission to the device using WIFI, satellite, cellular and radio signals, etc, and no need to rely on speed or other information originating from the native functions of the vehicle (110).

Positive and Negative Acceleration

As long as acceleration is calculated to be positive or zero when the vehicle (110) is within the alarming distance (247), the system can assume that the vehicle (110) will not stop before reaching the target location (246), and can trigger an alarm signal. In such instances escalating alarm signals can be triggered as the vehicle (110) approaches closer and closer to the target location (246). On the other hand, embodiments are contemplated in which no alarm is triggered, as long as the current speed is lower than a user-adjustable fixed speed, for example, 5 mph. This exception can be useful to prevent alarms from being triggered when a user wants to avoid alarms when using slow speed rolling stops at stop signs, or right turns on red.

Escalating alarm signals can be implemented in any suitable manner. For example, alarm signals can escalate from visual to auditory, or any combination of visual and auditory. By way of example, visual signals can escalate from steady state lights (280) to flashing lights (281), from slower flashing to faster flashing, from fewer lights to more lights, and/or from dimmer lights to brighter lights. And also by way of example, auditory signals can escalate from steady state (280) to intermittent (281), softer to louder, and/or lower to high pitch.

When acceleration is calculated to be negative, the vehicle (110) is decelerating, and the system could trigger no alarm at all, or could trigger one or more alarms, depending on how fast the vehicle is going, and how fast the deceleration is occurring relative to the distance from the target location (246). Rate of change in deceleration (jerk) can also be used in determining when and how alarms should trigger, and can be calculated from successive calculations of acceleration.

Likelihood Estimates and Risk Tolerance

As used herein, a likelihood estimate is an estimated (calculated) probability that a vehicle will pass through a target location while a stop signal is indicating that the vehicle should stop. Such estimations can be accomplished by assuming that a stop signal indicating that a vehicle should stop will continue with that indication, and (a) where acceleration is zero, that the vehicle maintains the current speed to the target location, or (b) where acceleration is not zero, that the speed will continue to be altered by the current acceleration. Where changes in rate(s) of acceleration (jerk) is/are calculated, that information can also be used to determine successive likelihood estimates.

As used herein, risk tolerance refers to a level of risk that a person is willing to take to avoid passing through a red light or stop sign, or in some other manner illegally failing to stop before reaching a target location. Risk tolerance is preferably user adjustable to different circumstances. For example, a user might select a higher risk tolerance for stop signs or yellow lights, a lower risk tolerance for red lights, and a lowest risk tolerance for blinking red lights or stop signals carried by a person directing traffic.

As applied to FIG. 1B, the processor (113) calculates successive or periodic likelihood estimates that the vehicle (110) will pass through the target location (246) while the stop signal is indicating that the vehicle (110) should stop. The processor (113) can then compare current likelihood estimates against the selected risk tolerance for the current situation, to determine when (and which) alarm signal(s) are to be triggered. Fixed stop signs can be deemed to always indicate that the vehicle should stop.

For illustrative purposes in this application, likelihood estimates can range from 0 to 100. A likelihood estimate of 0 indicates that there is little or no chance for the vehicle to pass illegally into the target location, and a likelihood estimate of 100 indicates that the vehicle has essentially a 100% chance of passing illegally into the target location. Also for illustrative purposes in this application, risk tolerances can range from 0 to 100, where 0 indicates low risk tolerance, and 100 indicates maximum risk tolerance. If a current likelihood estimate is higher than the then-current risk tolerance, the processor (113) triggers issuances of one or more alarm signals. If the discrepancy between estimated likelihood and risk tolerance is high, as for example, when the estimated likelihood is 75 and the risk tolerance is 25 (discrepancy of 50), the processor (113) could trigger a more urgent appearing/sounding alarm signal than if the estimated likelihood were 50 and the risk tolerance were 40 (discrepancy of 10).

Alarm signals can advantageously be terminated when the likelihood is lower than the selected risk tolerance, or when the stop signal is no longer indicating that the vehicle (110) should stop, as for example when a traffic light is changed from red to green or blue (223). In some embodiments, the signal can be terminated when the designated area (115) is touched.

Figure 3:
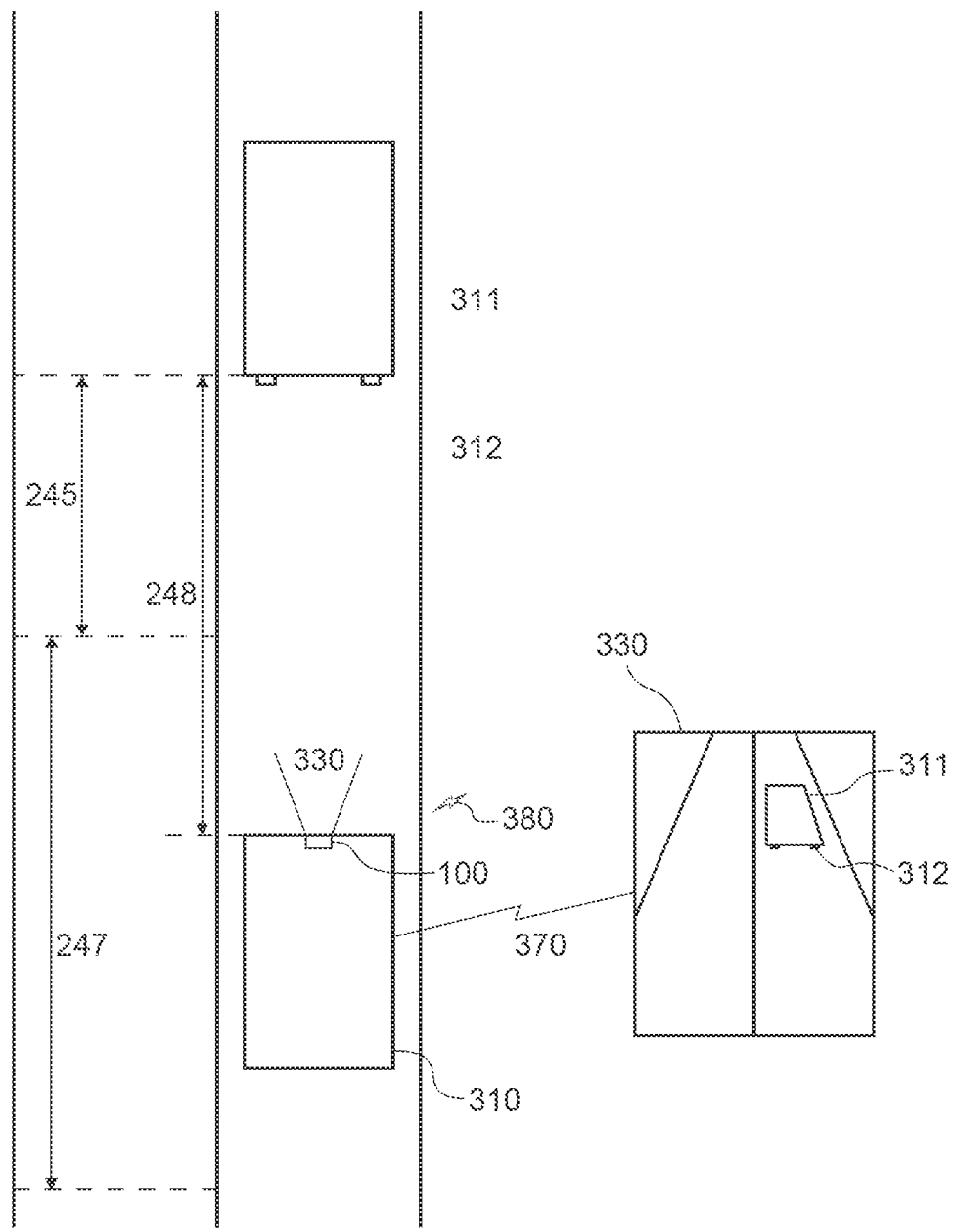
FIG. 3 shows two cars driving on the same lane, carrying the present inventive device in the following car.

FIG. 3 shows a schematic view of leading (311) and following (310) cars, driving in the same lane, where an instance of the device (100) is set on the dashboard of the following car (310), facing at least mostly forward. In such instances, an illuminated brake light (312) of the preceding car (311) can be considered as a stop signal, and distances from the distances (248) from the device (100) to the brake light (312) are deemed to be the distances (D1, D2, D3) etc in the discussion of speed and acceleration discussed above. Likelihood estimates and risk tolerances to issuance of alarm signals can also be determined as discussed above.

Device (100) detects the illuminated brake light (312) of leading vehicle (311), and estimates the inter-vehicle distance between (248) the brake light (312) and the vehicle (310). Contemplated systems and methods for detection of the brake light (312) and the estimation of the inter-vehicle distance (248) are described in "Brake light Detection by Image Segmentation by Tantalo et al.", that is incorporated herein by reference in its entirety. Other analytical methods and the combination of the methods can be used to detect the brake light and to estimate the distance.

Figure 4A:
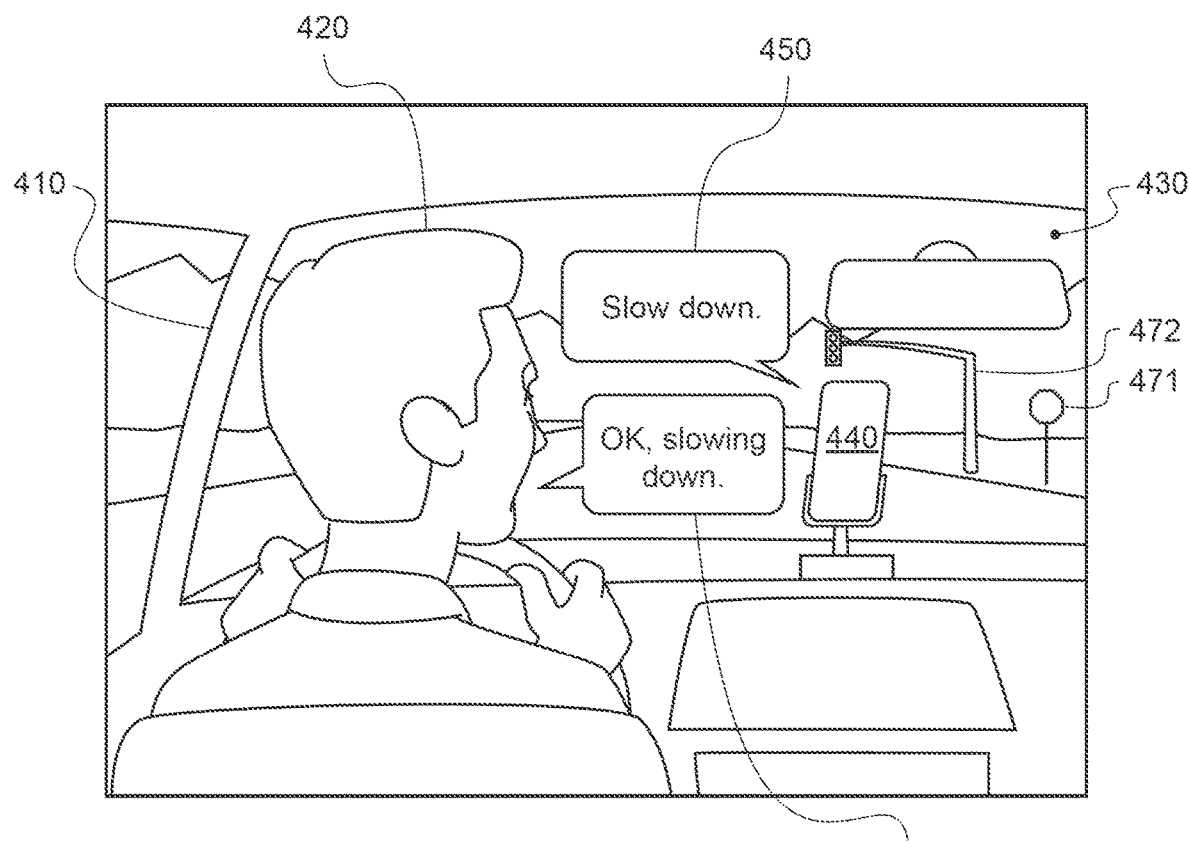
FIG. 4A is a schematic depicting a vehicle-mounted electronic device using relative changes in apparent size of a stop signal to estimate distance, speed, and acceleration of the vehicle. The device uses that information to warn the driver of a potential failure to stop or sufficiently slow down in time, and the driver uses a hand or foot to slow the vehicle pursuant to the warning.
Figure 4B:
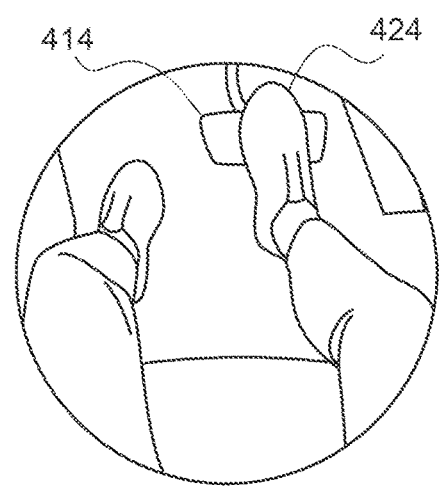
FIG. 4B is a schematic showing the driver responding to a warning by pressing his/her foot 424 on the brake pedal 414.
Figure 5:
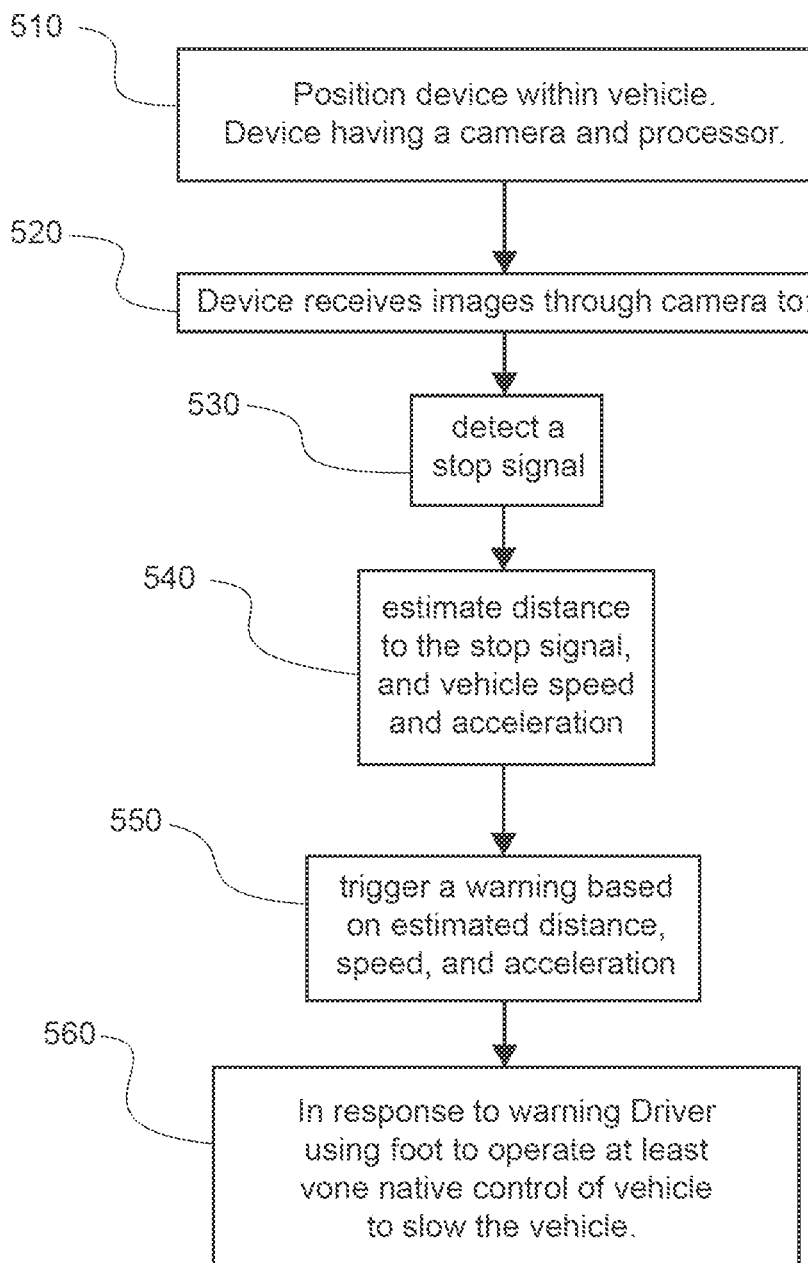
FIG. 5 is a flowchart providing textual description of steps corresponding to the schematics of FIGS. 4A and 4B.

FIGS. 4A, 4B, and 5 should be read together to depict a situation in which a driver 420 has positioned a cell phone or other electronic device on the dashboard of a motor vehicle 410, such that the device 440 is receiving multiple images (still or video) through window 430. Device 440 uses the received images to calculate relative changes in size of a stop signal, (e.g., stop sign 471 or stop light 472), distances of the vehicle 410 to the stop signal, and corresponding speeds and accelerations.

In FIGS. 4A, 4B and 5, the device 440 uses the calculated distances, speeds, and accelerations to calculate that the vehicle 410 is in danger of not stopping before arriving at an appropriate distance from the stop signal 471 or 472. The device 440 then sends an alarm to the driver 420 in the form of a verbal warning 450 "slow down". In response to the warning, the driver 420 replies with a verbal command 460 (e.g., "OK, slowing down") and/or uses his foot 422 to operate a foot pedal 424 or other native control 414, to slow the vehicle 410. The device 440 then stops warning the driver 420 further to one or more of such actions by the driver.

Other body parts could also be used to slow or stop vehicle 410. For example, driver 420 could use his/her hand to turn off cruise control or other driver assist system.

As used herein the term "portable", with respect to electronic devices used in calculating distance, speed, and acceleration of a vehicle, is limited to either (a) a device that is not native to the vehicle, or (b) a device that is native to the vehicle, weighs less than 250 grams, and has a cellular functionality when removed from the vehicle.

Although not expressly shown in any of the drawing figures, methods are contemplated where an entity provides software to accomplish the features and steps set forth in FIGS. 4 and 5.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of operating a vehicle using a portable electronic, the method comprising:
   receiving images through a camera of the portable electronic device;
   using at least three of the images to:
      estimate speed and acceleration of the vehicle;
      detect a stop signal;
      estimate a distance to the stop signal; and
      trigger a warning to a driver based upon the estimated speed, acceleration of the vehicle, and estimated distance to the stop signal; and
   in response to the warning, the driver operating at least one native control of the vehicle to slow the vehicle.

2. The method of claim 1, wherein the vehicle is not natively equipped to warn of a risk of running a red light or failing to stop at a stop sign.

3. The method of claim 1, wherein the vehicle is not natively equipped to autonomously stop the vehicle to avoid running a red light or failing to stop at a stop sign.

4. The method of claim 1, wherein the stop signal comprises a traffic light.

5. The method of claim 1, wherein the stop signal comprises a stop sign.

6. The method of claim 1, wherein the stop signal is a braking light on a second vehicle in front of the vehicle being driven by the driver.

7. The method of claim 1, wherein triggering of the warning is not reliant on any WIFI, cellular, satellite, or radio signal.

8. The method of claim 1, further comprising adjusting a level of risk utilized in triggering the warning.

9. The method of claim 1, further comprising adjusting a threshold distance that the portable electronic device uses in triggering the warning.

10. The method of claim 1, further comprising adjusting use of light and sound that the portable electronic device uses in escalating the warning.

11. The method of claim 1, further comprising adjusting a threshold speed below which the warning is not triggered.

12. The method of claim 1, further comprising using a voice command to actively terminate the warning.

13. The method of claim 1, wherein the portable electronic device comprises a cell phone.

14. A method of assisting a driver to operate a vehicle, wherein the vehicle has a windshield, and the driver has a portable electronic device that includes a processor, the method comprising providing software for installation into the portable electronic device, the software executable by the processor to:
   use apparent changes in sizes of a stop signal in at least three images captured by a camera to estimate a distance to the stop signal, and speed and acceleration of the vehicle;
   trigger a warning based upon the estimated distance, speed, and acceleration, and stop the warning further to an action by the driver.

15. The method of claim 14, wherein the portable electronic device comprises a cell phone.

16. The method of claim 14, wherein the vehicle is not natively equipped to warn of a risk of running a red light or failing to stop at a stop sign.

17. The method of claim 14, wherein the vehicle is not natively equipped to autonomously stop the vehicle to avoid running a red light or failing to stop at a stop sign.

18. The method of claim 14, wherein the software configures the portable electronic device to estimate a current distance between the vehicle and the stop signal using apparent changes in sizes of the stop signal in the images received by the camera.

19. The method of claim 14, further comprising the driver cooperating with the portable electronic device by using a body part to operate at least one native control of the vehicle in response to the warning.

20. The method of claim 14, wherein the portable electronic device is not native to the vehicle.

* * * * *